Feb. 27, 1934. R. A. ELLIOTT 1,948,493
INDICATOR
Filed March 12, 1932
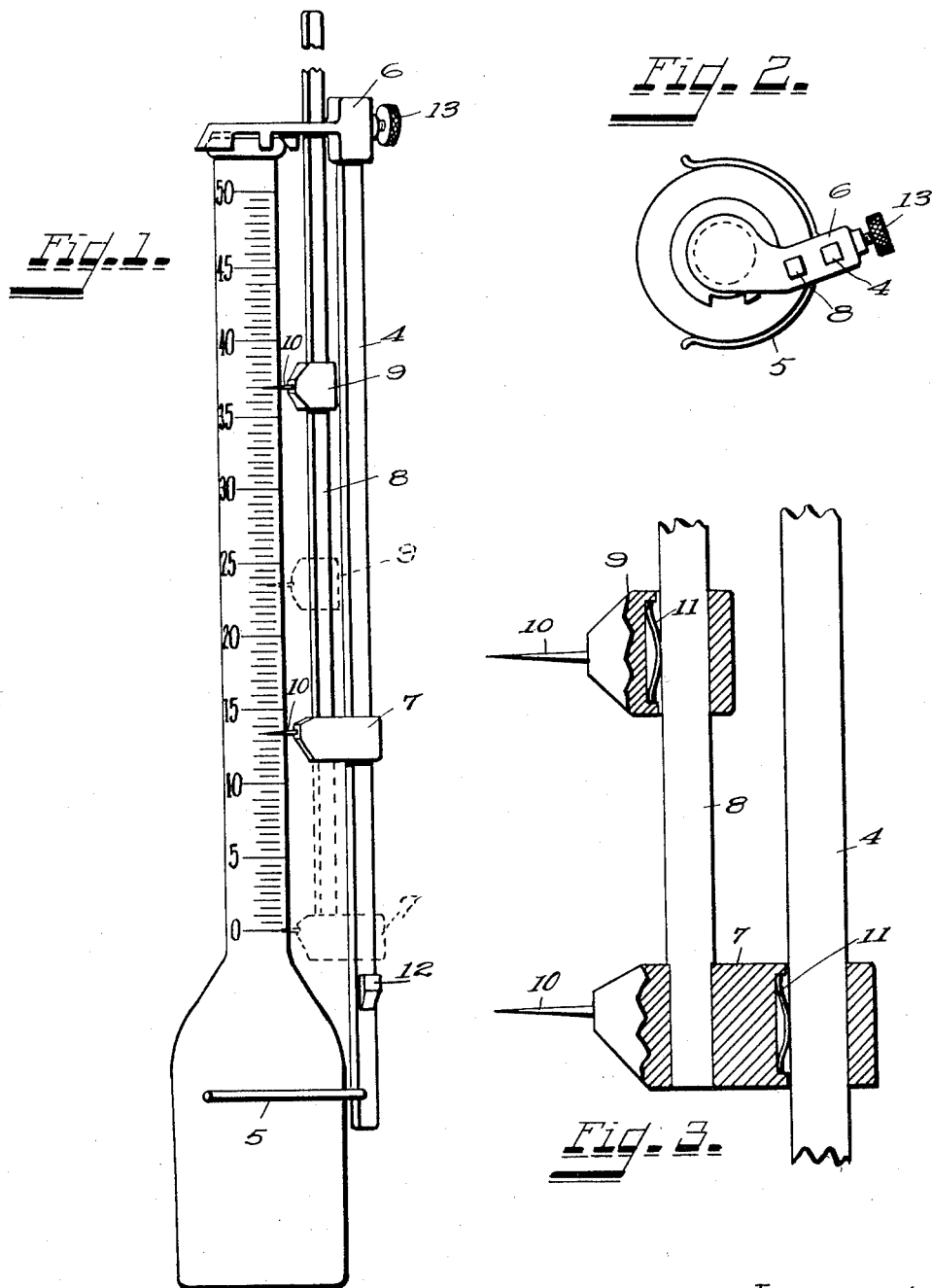

Patented Feb. 27, 1934

1,948,493

UNITED STATES PATENT OFFICE 1,948,493

INDICATOR

Robert A. Elliott, Peoria, Ill.

Application March 12, 1932. Serial No. 598,381

2 Claims. (Cl. 33—143)

My invention relates more particularly to devices used in creameries in connection with the testing of the amount of butter fat in cream.

One object of my invention is the provision of a device which may be used in connection with long or short necked bottles which are used in centrifuges, these bottles being usually graduated on the neck portion.

Another object of my invention is the provision of a device which may be easily dis-assembled for cleaning and afterwards re-assembled for use.

Another object of my invention is to provide a device which is accurate and speedy in operation; is easily and quickly attached to or detached from a bottle, and is maintained in proper position on the bottle during a testing operation.

Other objects of my invention will appear and be described in the specification.

The novelty of my invention will be hereinafter more fully set forth and specifically pointed out in the claims.

In the accompanying drawing:

Fig. 1 is a side elevation of a testing bottle showing my device attached thereto and in process of being used.

Fig. 2 is a plan view of Fig. 1.

Fig. 3 is an enlarged detail sectional view of the indicating pointers and associated parts.

The same numerals of reference are used to indicate identical parts in all the figures.

In creameries it is customary to test samples of cream to determine the quality thereof and these tests are usually made by placing a sample in a long necked bottle or container, the neck of which is graduated, and then subjecting the sample to centrifugal treatment, after which, by properly reading the graduations on the neck of the bottle, the quality of the cream may be determined.

The usual way of making the reading is by a pair of dividers, one point of which is set opposite the division between the cream and the milk or between the cream and the butter fat as the case may be, while the other point is placed at the top of the cream or the butter fat whereupon the dividers are moved down so that one of the points rests at zero of the graduations whereupon the scale is read directly by the other point without the necessity for any calculation.

I am aware that there have been several patents issued for machines which contemplate the use of movable points which are first set to the proper place and then moved for a scale reading and so I do not broadly claim this feature.

For purposes of illustration and to show one form of device embodying my invention, though without limiting myself to the details of construction and arrangement of parts shown and to be herein described, I have shown a device comprising a main bar or frame 4, carrying near its lower end a container embracing spring clip 5 adapted to position said main bar or member with respect to said container, and having adjustably mounted thereon an upper centering and supporting piece or element 6 comprising an extension arranged for engagement with the upper end of said bottle or container.

The bar 4 carries a slide 7 and this in turn carries a second bar 8, upon which is mounted a slide 9. Each of the slides 7 and 9 carries an index 10. The slide 7, as shown more clearly in Fig. 3, frictionally engages the bar 4, being held in any adjusted position by a spring 11, and the slide 9 similarly engages the bar 8, though its spring 11 is of less tension than the spring of the slide 7, to the end that the slide may be moved up or down on the bar 8 without moving the slide 7 on the bar 4.

A stop 12 is carried by the bar 4 a slight distance below the zero reading on the scale of the neck of the bottle to limit downward movement of slide 7.

The centering piece 6 is provided with a set screw 13 by which it may be secured in any desired position along the length of the bar 4, this piece 6 being perforated to permit the bar 8 to be moved up and down therethrough and to form an upper guide therefor, and is provided with a conical portion, partly cut away, to engage and center the upper end of the neck of the bottle as clearly shown in Fig. 1. The cutaway portions of the piece 6 afford a view to the uppermost portion of the neck of the bottle and also permit the slide 7 to move upward without restriction.

It is obvious that when used with a bottle having a neck shorter than the one shown in Fig. 1, the piece 6 can be re-set along the bar 4 to properly engage the upper end of the neck of the bottle.

To dis-assemble the device, the piece 6 is first removed by loosening the set screw 13 after which the slide 7 and bar 8 may be removed from the bar 4 and the slide 9 removed from the bar 8.

Assuming that the bottle in Fig. 1 has been through the centrifugal process in testing for butter fat, and the division between the butter fat and the balance of the cream is at the graduation of thirteen and one-half, the slide 7 is moved to bring its index 10 to that graduation, as shown in full lines and if the top of the butter fat stands at the graduation thirty-seven, the slide 9 is moved to bring its index 10 to that point, whereupon the slide 7 is then moved to bring its index to zero which moves the index of the slide 9 to the graduation twenty-three and one-half which is the correct reading for that sample. The proper method of handling is to first move the slide 7, then the slide 9, then the slide 7 again to the zero point for the reading.

Having thus fully described my invention, I claim:

1. In an indicator of the character described, in combination, a substantially vertical member having a container embracing means near the lower end thereof adapted to position said member with respect to such container, a centering and supporting element mounted near the upper end of said member comprising an extension arranged for engagement with the upper end of such container, a slide carried by said member including an indexing device, a second member supported by said slide, the upper end thereof being guided by said centering and supporting element, and a slide including an indexing device carried by said second member.

2. In an indicator of the character described, in combination, a substantially vertical member having a container embracing means near the lower end thereof adapted to position said member with respect to such container, a centering and supporting element adjustably mounted near the upper end of said member comprising an extension arranged for engagement with the upper end of such container, a slide carried by said member including an indexing device, a second member supported by said slide, the upper end thereof being guided by said centering and supporting element, a slide including an indexing device carried by said second member, and a stop carried by said first mentioned member to limit the downward movement of said first mentioned slide.

ROBERT A. ELLIOTT.